(12) United States Patent
Lin

(10) Patent No.: US 7,909,579 B2
(45) Date of Patent: Mar. 22, 2011

(54) ROTOR HEAD FOR A TWIN-ROTOR HELICOPTER

(75) Inventor: Charles Lin, Preston, MS (US)

(73) Assignee: CVC Technologies, Inc., Fontana, CA (US)

( * ) Notice: Subject to any disclaimer, the term of this patent is extended or adjusted under 35 U.S.C. 154(b) by 874 days.

(21) Appl. No.: 11/846,568

(22) Filed: Aug. 29, 2007

(65) Prior Publication Data

US 2009/0060742 A1    Mar. 5, 2009

(51) Int. Cl.
*B64C 11/04* (2006.01)

(52) U.S. Cl. .................................... 416/210 R; 416/500

(58) Field of Classification Search .............. 416/210 R, 416/210 A, 500
See application file for complete search history.

(56) References Cited

U.S. PATENT DOCUMENTS

| | | | | |
|---|---|---|---|---|
| 2,418,030 A | * | 3/1947 | Hirsch | 416/103 |
| 3,637,322 A | * | 1/1972 | Kannamuller et al. | 416/138 |
| 3,972,491 A | * | 8/1976 | Ferris et al. | 244/17.27 |
| 4,306,836 A | * | 12/1981 | Mayerjak | 416/134 A |

* cited by examiner

*Primary Examiner* — Ninh H Nguyen

(57) ABSTRACT

A rotor head includes a hub and two joint members. The hub has opposite tubular end portions, each formed with a socket that extends inwardly from an end face thereof along a tube axis and that has inner and outer socket sections. Each of the joint members includes a link and a vibration absorbing component. The link has a hub coupling segment retained rotatably in the inner socket section of a respective socket, an intermediate segment extending from the hub coupling segment and disposed movably in the outer socket section of the respective socket, and a blade coupling segment extending from the intermediate segment and outwardly of the outer socket section. The vibration absorbing component is mounted on the intermediate segment, and is disposed in the outer socket section.

10 Claims, 6 Drawing Sheets

US 7,909,579 B2

ROTOR HEAD FOR A TWIN-ROTOR HELICOPTER

BACKGROUND OF THE INVENTION

1. Field of the Invention

The invention relates to a twin-rotor helicopter, more particularly to a rotor head for a twin-rotor helicopter.

2. Description of the Related Art

As shown in FIG. 1, a conventional twin-rotor helicopter includes a rotor head 1 having a pair of rotor coupling seats 101 for coupling to a pair of rotor blades 2, respectively. The rotor seats 101 are interconnected integrally, and are mounted on a drive shaft 3 of the twin-rotor helicopter such that they are movable in a seesaw manner.

In flight, the drive shaft 3 drives rotation of the rotor blades 2 through the rotor coupling seats 101. However, in view of the seesaw connection of the rotor coupling seats 101 to the drive shaft 3, when one of the rotor blades 2 pivots upward, the other rotor blade 2 pivots downward, which can affect flight stability.

SUMMARY OF THE INVENTION

Therefore, the object of the present invention is to provide a rotor head for a twin-rotor helicopter that permits a pair of rotor blades to flap independently of each other so as to improve flight stability.

Accordingly, a rotor head for a twin-rotorhelicopter of the present invention is adapted to be mounted on a drive shaft and is adapted to be coupled to a pair of rotor blades. The rotor head comprises a hub and a pair of joint members.

The hub has a pair of tubular end portions that extend along a tube axis and that are opposite to each other along the tube axis. Each of the tubular end portions has an end face and is formed with a socket that extends inwardly from the end face along the tube axis and that has an inner socket section and an outer socket section disposed between the inner socket section and the end face.

Each of the joint members is adapted to connect a respective one of the rotor blades to the socket of a respective of the tubular end portions, and includes a link and a vibration absorbing component.

The link has a hub coupling segment retained rotatably in the inner socket section of the socket of the respective one of the tubular end portions and pivotable about a pivot axis transverse to the tube axis, an intermediate segment extending from the hub coupling segment and disposed movably in the outer socket section of the socket of the respective one of the tubular end portions, and a blade coupling segment extending from the intermediate segment, extending outwardly of the outer socket section of the socket of the respective one of the tubular end portions, and adapted to be coupled to the respective one of the rotor blades.

The vibration absorbing component is mounted on the intermediate segment of the link, and is disposed in the outer socket section of the socket of the respective one of the tubular end portions.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
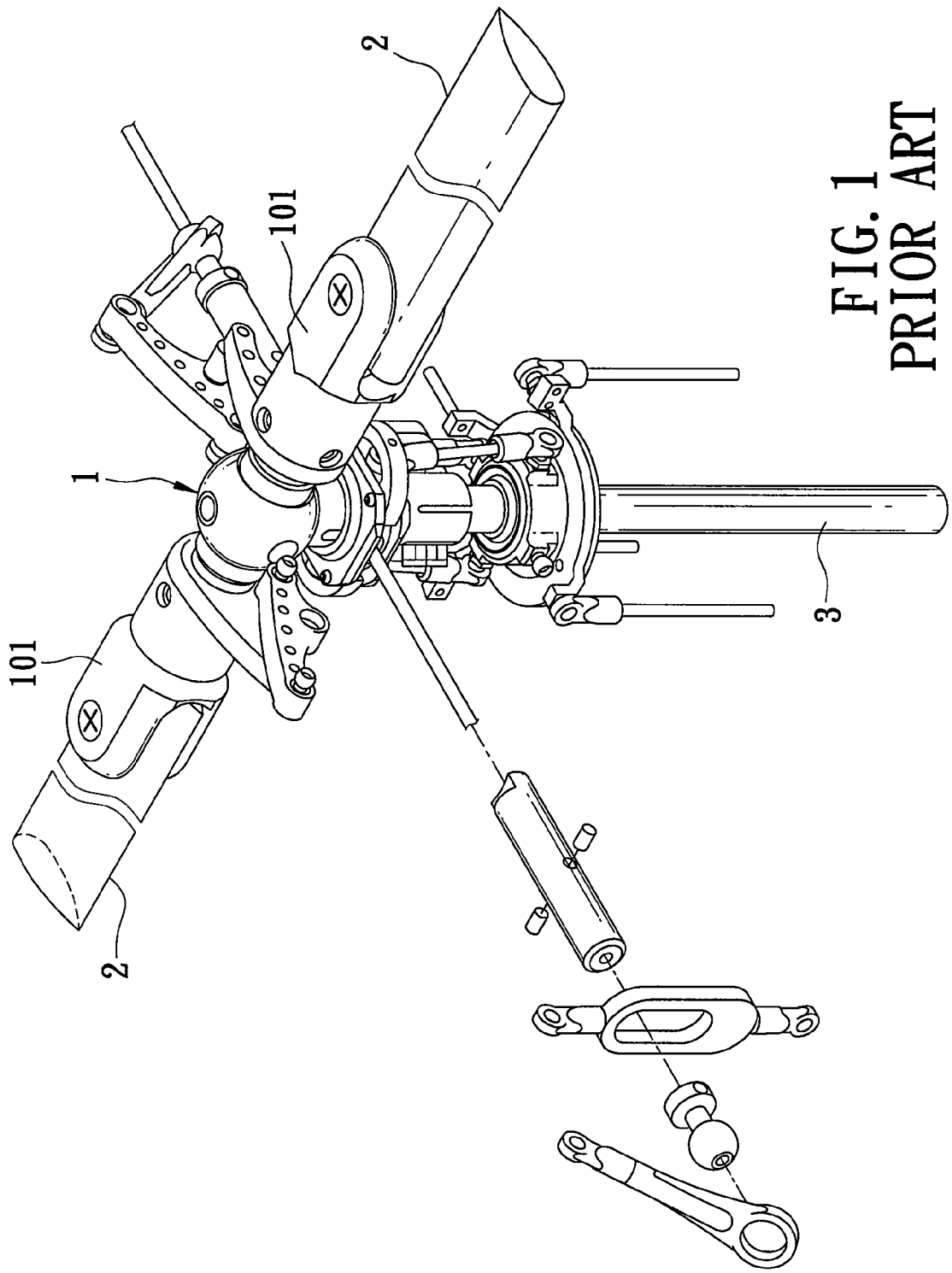
FIG. 1 is a fragmentary partly exploded perspective view of a conventional rotor head of a twin-rotor helicopter.
Figure 2:
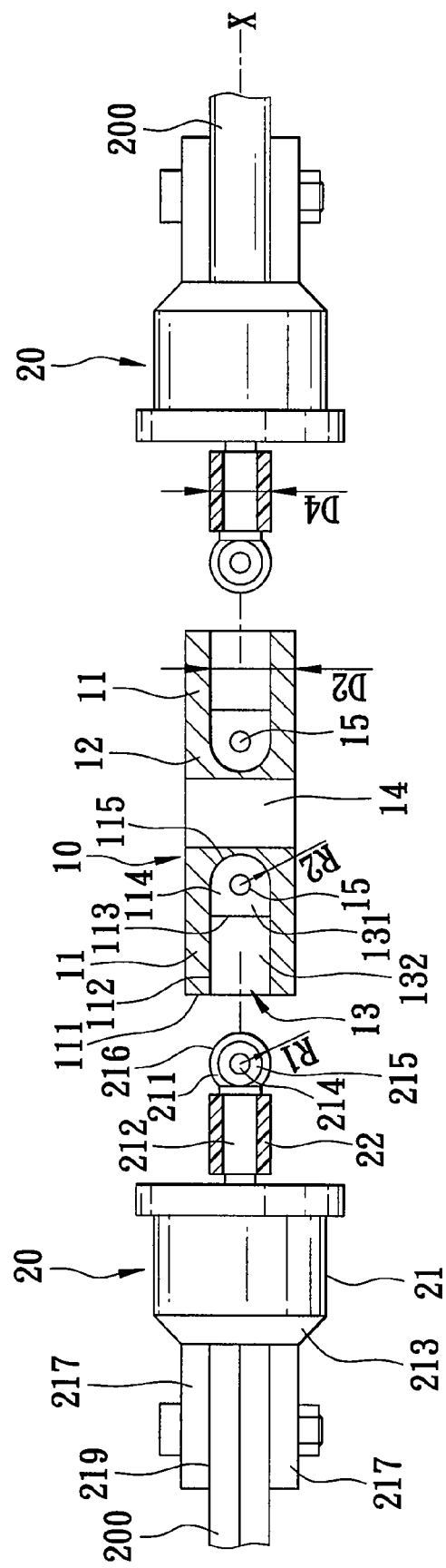
FIG. 2 is an exploded partly sectional schematic side view of the preferred embodiment of a rotor head for a twin-rotor helicopter according to the present invention.
Figure 3:
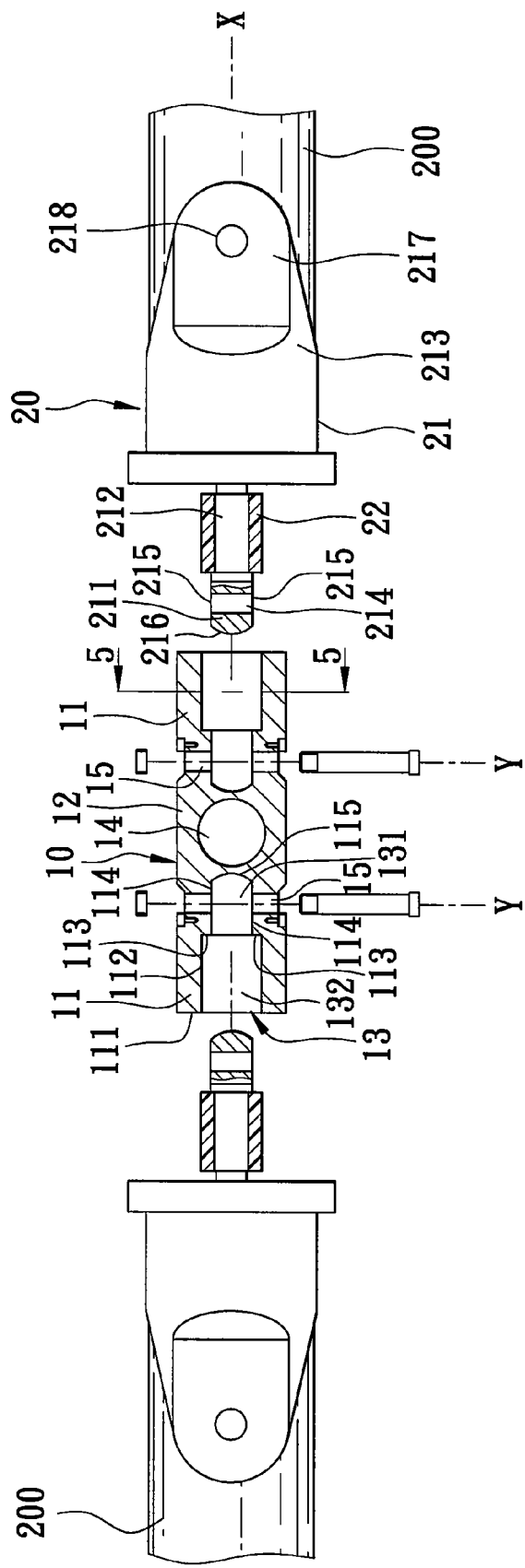
FIG. 3 is an exploded partly sectional schematic top view of the preferred embodiment.
Figure 4:
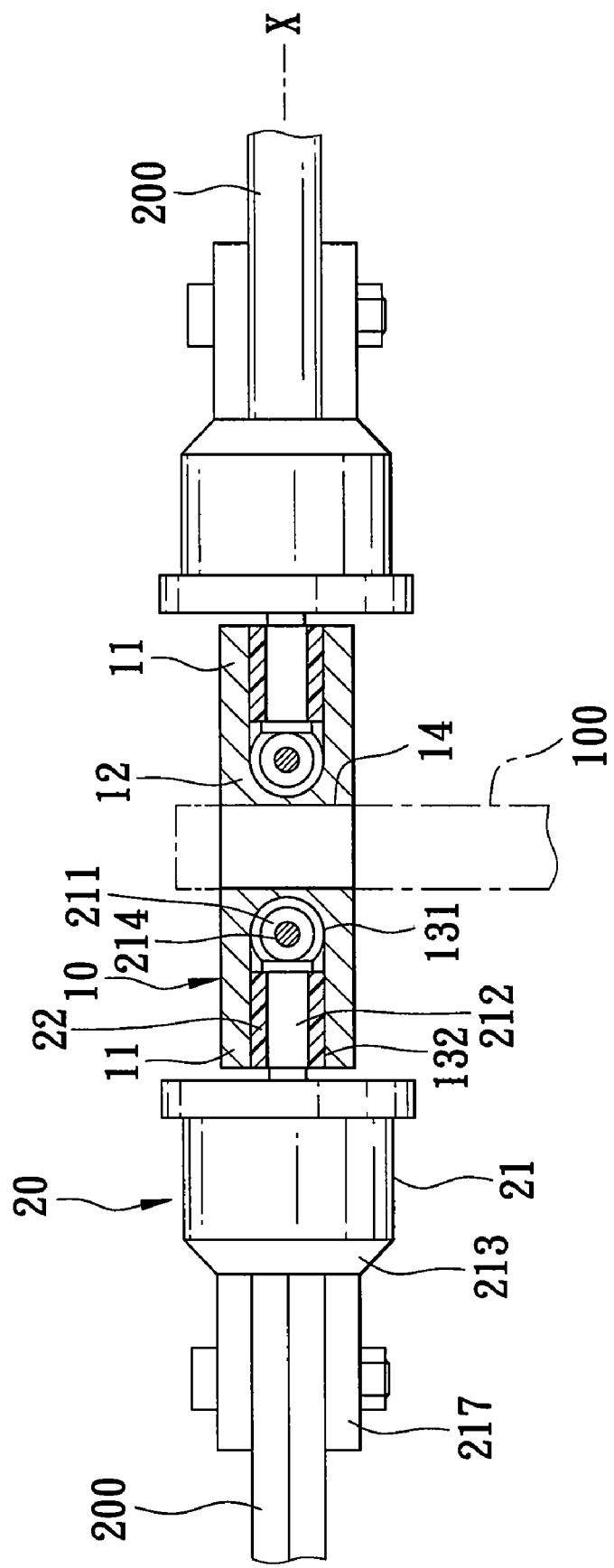
FIG. 4 is an assembled partly sectional schematic side view of the preferred embodiment.

Referring to FIGS. 2 to 4, the preferred embodiment of a rotor head for a twin-rotor helicopter according to the present invention is shown to be adapted to be mounted on a drive shaft 100 and adapted to be coupled to a pair of rotor blades 200. The rotor head comprises a hub 10 and a pair of joint members 20.

The hub 10 has a pair of tubular end portions 11 that extend along a tube axis (X) and that are opposite to each other along the tube axis (X). Each of the tubular end portions 11 has an end face 111 and is formed with a socket 13 that extends inwardly from the end face 111 along the tube axis (X) and that has an inner socket section 131 and an outer socket section 132 disposed between the inner socket section 131 and the end face 111. The hub 10 further has an intermediate shaft coupling portion 12 connected to and disposed between the tubular end portions 11 and formed with a mounting hole 14 for coupling to the drive shaft 100.

Each of the joint members 20 is adapted to connect a respective one of the rotor blades 200 to the socket 13 of a respective of the tubular end portions 11, and includes a link 21 and a vibration absorbing component 22.

The link 21 has a hub coupling segment 211 retained rotatably in the inner socket section 131 of the socket of the respective one of the tubular end portions 11 and pivotable about a pivot axis (Y) transverse to the tube axis (X), an intermediate segment 212 extending from the hub coupling segment 211 and disposed movably in the outer socket section 132 of the socket 13 of the respective one of the tubular end portions 11, and a blade coupling segment 213 extending from the intermediate segment 212, extending outwardly of the outer socket section 132 of the socket 13 of the respective one of the tubular end portions 11, and adapted to be coupled to the respective one of the rotor blades 200.

In this embodiment, each of the tubular end portions 11 of the hub 10 is formed with a through hole 15 extending parallel to the pivot axis (Y) of the respective one of the joint members 20 and in spatial communication with the inner socket section 131. The hub coupling segment 211 of the link 21 of each of the joint members 20 is formed with a pivot hole 214 registered with the through hole 15 in the corresponding one of the tubular end portions 11 of the hub 10. A pair of fasteners extend through the through holes 15 in the hub 10 and the pivot holes 214 in the links 21 so as to couple pivotally the hub coupling segments 211 to the tubular end portions 11.

Figure 5:
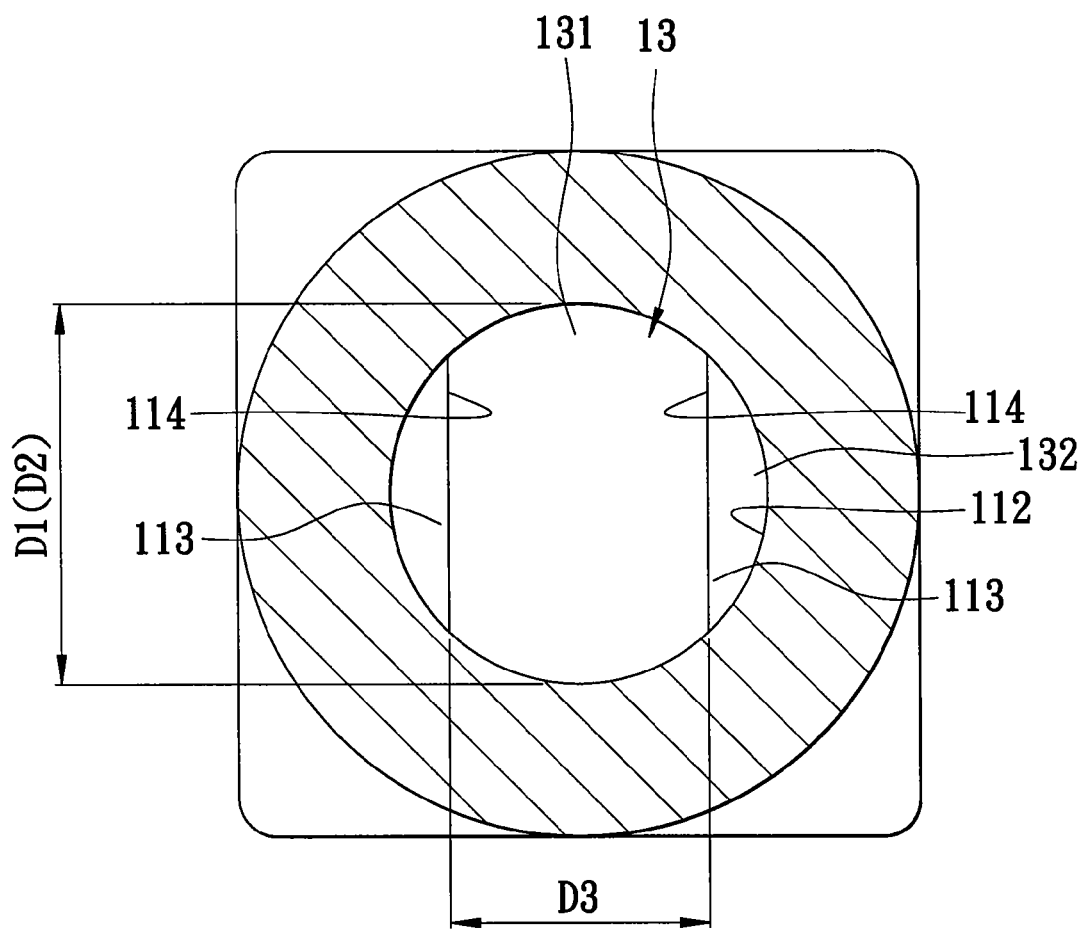
FIG. 5 is a schematic sectional view of the preferred embodiment taken along line 5-5 in FIG. 3.

With further reference to FIG. 5, the outer socket section 132 of the socket 13 of each of the tubular end portions 11 has a circular socket wall 112 that surrounds the tube axis (X) and that has a diameter (D2) with respect to the tube axis (X). The inner socket section 131 of the socket 13 of each of the tubular end portions 11 has a curved socket wall 115 (see FIGS. 2 and 3) that surrounds the pivot axis (Y) of the respective one of the joint members 20, that has a largest diameter (D1) with respect to the pivot axis (Y) of the respective one of the joint members 20, the largest diameter (D1) being substantially equal to the diameter (D2) of the circular socket wall 112 of the outer socket section 132, and that has a length (D3) along the pivot axis (Y) of the respective one of the joint members 20 that is smaller than the diameter (D2) of the circular socket wall 115 of the outer socket section 132.

In this embodiment, the socket 13 of each of the tubular end portions 11 is formed with a pair of shoulders 113 that are located at a junction of the inner and outer socket sections 131, 132 and that are disposed at opposite sides of the tube axis (X). The inner socket section 131 of the socket 13 of each of the tubular end portions 11 further has a pair of side walls 114, each of which extends parallel to the tube axis (X) from a respective one of the shoulders 113 to a corresponding edge of the curved socket wall 115.

The hub coupling segment 211 of the link 21 of each of the joint members 20 has a pair of side surfaces 215 that respectively confront the side walls 114 of the inner socket section 131 of the socket 13 of the respective one of the tubular end portions 11, and a curved surface 216 that interconnects the side surfaces 215 and that has a radius (R1) of curvature corresponding to a radius (R2) of the curved socket wall 115 of the inner socket section 131 of the socket 13 of the respective one of the tubular end portions 11.

The blade coupling segment 213 of the link 21 of each of the joint members 20 has a pair of parallel lugs 217 that are each formed with a fastener hole 218 and that cooperate to confine a retaining space 219. In this embodiment, an inner end of each of the rotor blades 200 is fixed in the retaining space 219 between the lugs 217 of the blade coupling segment 213 of the link 21 of the respective joint member 20.

The vibration absorbing component 22 of each of the joint members 20 is sleeved on the intermediate segment 212 of the link 21 of the respective joint member 20, is disposed in the outer socket section 132 of the socket 13 of the respective tubular end portion 11, and has an outer diameter (D4) not larger than the diameter (D2) of the circular socket wall 112 of the outer socket section 132 of the socket 13 of the respective tubular end portion 11. In this embodiment, the vibration absorbing component 22 is made of polyurethane material, and the outer diameter (D4) thereof is substantially equal to the diameter (D2) of the circular socket wall 112.

As shown in FIG. 4, the drive shaft 100 drives rotation of the rotor blades 200 through the hub 10 and the joint members 20.

Figure 6:
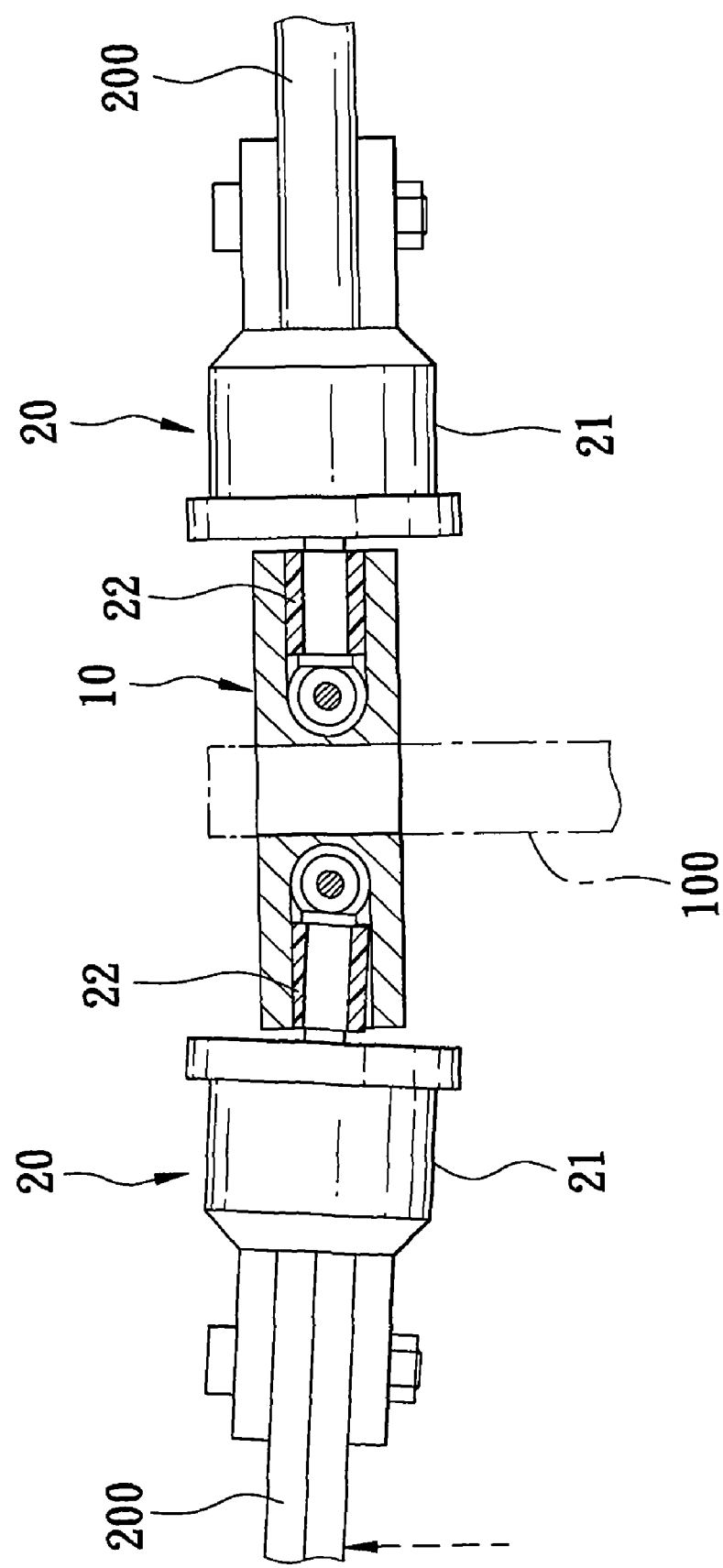
FIG. 6 is a view similar to FIG. 4, illustrating flapping of one of two rotor blades.

As shown in FIG. 6, the link 21 of each of the joint members 20 is capable of pivoting relative to the hub 10 independently of the other joint member 20. Therefore, during helicopter flight, upward pivoting of one of the rotor blades 200 does not lead to pivoting of the other rotor blade 200. Moreover, the vibration absorbing components 22 can absorb vibrations attributed to relative movement between the links 21 and the hub 10. Therefore, use of the rotor head of this invention can improve flight stability of a helicopter as compared to the prior art.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A rotor head adapted to be mounted on a drive shaft and adapted to be coupled to a pair of rotor blades, said rotor head comprising:

a hub having a pair of tubular end portions that extend along a tube axis and that are opposite to each other along the tube axis, each of said tubular end portions having an end face and being formed with a socket that extends inwardly from said end face along the tube axis and that has an inner socket section and an outer socket section disposed between said inner socket section and said end face; and a pair of joint members, each adapted to connect a respective one of the rotor blades to said socket of a respective of said tubular end portions and each including a link having a hub coupling segment retained rotatably in said inner socket section of said socket of the respective one of said tubular end portions and pivotable about a pivot axis transverse to the tube axis, an intermediate segment extending from said hub coupling segment and disposed movably in said outer socket section of said socket of the respective one of said tubular end portions, and a blade coupling segment extending from said intermediate segment, extending outwardly of said outer socket section of said socket of the respective one of said tubular end portions, and adapted to be coupled to the respective one of the rotor blades, and a vibration absorbing component mounted on said intermediate segment of said link and disposed in said outer socket section of said socket of the respective one of said tubular end portions.

2. The rotor head as claimed in claim 1, wherein said outer socket section of said socket of each of said tubular end portions has a socket wall that surrounds the tube axis and that has a diameter with respect to the tube axis, said vibration absorbing component being sleeved on said intermediate segment of said link and having an outer diameter that is not larger than the diameter of said socket wall of said outer socket section of said socket of the respective one of said tubular end portions.

3. The rotor head as claimed in claim 1, wherein said outer socket section of said socket of each of said tubular end portions has a circular socket wall that surrounds the tube axis and that has a diameter with respect to the tube axis, said inner socket section of said socket of each of said tubular end portions having a curved socket wall that surrounds the pivot axis of the respective one of said joint members, that has a largest diameter with respect to the pivot axis of the respective one of said joint members, the largest diameter being substantially equal to the diameter of said circular socket wall of said outer socket section, and that has a length along the pivot axis of the respective one of said Joint members that is smaller than the diameter of said circular socket wall of said outer socket section.

4. The rotor head as claimed in claim 3, wherein said socket of each of said tubular end portions is formed with a pair of shoulders that are located at a junction of said inner and outer socket sections and that are disposed at opposite sides of the tube axis, said inner socket section of said socket of each of said tubular end portions further having a pair of side walls, each of which extends parallel to the tube axis from a respective one of said shoulders to a corresponding edge of said curved socket wall.

5. The rotor head as claimed in claim 4, wherein said hub coupling segment of said link of each of said joint members has a pair of side surfaces that respectively confront said side walls of said inner socket section of said socket of the respective one of said tubular end portions, and a curved surface that interconnects said side surfaces and that has a radius of curvature corresponding to that of said curved socket wall of said inner socket section of said socket of the respective one of said tubular end portions.

6. The rotor head as claimed in claim 1, wherein said blade coupling segment of said link of each of said joint members has a pair of parallel lugs that are each formed with a fastener hole and that cooperate to confine a retaining space.

7. The rotor head as claimed in claim 1, wherein said hub further has an intermediate shaft coupling portion connected to and disposed between said tubular end portions, and formed with a mounting hole for coupling to the drive shaft.

8. The rotor head as claimed in claim 1, wherein each of said tubular end portions of said hub is formed with a through hole extending parallel to the pivot axis of the respective one of said joint members and in spatial communication with said inner socket section.

9. The rotor head as claimed in claim 8, wherein said hub coupling segment of said link of each of said joint members is formed with a pivot hole registered with said through hole in the corresponding one of said tubular end portions of said hub.

10. The rotor head as claimed in claim 1, wherein said vibration absorbing component is made of polyurethane material.

* * * * *